(12) United States Patent
Lum et al.

(10) Patent No.: US 7,624,488 B2
(45) Date of Patent: Dec. 1, 2009

(54) ONE-PIECE BARREL ASSEMBLY CART

(75) Inventors: Matthew K. Lum, Mercer Island, WA (US); David L. Wagner, Goldendale, WA (US); Thomas D. Hall, Everett, WA (US); Darrell D. Jones, Mill Creek, WA (US); Joseph A. Appleton, Arlington, WA (US); Vincent T. Olson, Mukilteo, WA (US); Noel A. Spishak, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 599 days.

(21) Appl. No.: 11/005,667

(22) Filed: Dec. 7, 2004

(65) Prior Publication Data

US 2006/0118235 A1 Jun. 8, 2006

(51) Int. Cl.
*B21D 53/88* (2006.01)

(52) U.S. Cl. .................... 29/281.5; 29/469; 29/559; 29/897.2; 269/287

(58) Field of Classification Search .................. 29/897, 29/897.2, 897.33, 431, 464, 468, 469, 559, 29/799, 281.1, 281.4, 281.5; 269/287, 289, 269/294, 309, 17, 21, 37
See application file for complete search history.

(56) References Cited

U.S. PATENT DOCUMENTS

| | | | |
|---|---|---|---|
| 2,374,894 A | 5/1945 | Pioch et al. | |
| 3,374,528 A * | 3/1968 | Bowcutt et al. | 228/173.6 |
| 3,879,245 A | 4/1975 | Fetherson et al. | |
| 4,064,534 A | 12/1977 | Chen et al. | |
| 4,170,813 A * | 10/1979 | Baird et al. | 29/281.3 |
| 4,310,132 A | 1/1982 | Frosch | |
| 4,356,615 A * | 11/1982 | Dearman | 29/525 |
| 4,548,859 A | 10/1985 | Kline et al. | |

(Continued)

FOREIGN PATENT DOCUMENTS

DE 688453 2/1940

(Continued)

OTHER PUBLICATIONS

PCT Search Report for PCT/US05/42472, Aug. 2, 2007, The Boeing Company.

(Continued)

*Primary Examiner*—David P Bryant
*Assistant Examiner*—Christopher M Koehler (57) ABSTRACT

A one-piece barrel assembly cart includes a right assembly cart base connected with a left assembly cart base and at least three stabilizer rings that are attached to the assembly cart base. The one-piece barrel assembly cart may be used to stabilize a tapered cured composite barrel, for example the large fuselage barrel of the aft section of a large new generation aircraft, such as a 7E7 Boeing airplane. A modular assembly cart includes at least two identical modules. Each of these modules includes a cart base and a stabilizer ring. The diameter of the inner surface of the stabilizer ring may vary as needed. Other modules including a fuselage support may be added. By providing modular assembly carts any shape and size of a one-piece composite barrel may be stabilized after curing of the composite material.

13 Claims, 8 Drawing Sheets

U.S. PATENT DOCUMENTS

| | | | |
|---|---|---|---|
| 4,608,220 A | | 8/1986 | Caldwell |
| 4,637,540 A | * | 1/1987 | Fujita et al. ............... 228/49.2 |
| 4,693,678 A | | 9/1987 | Von Volkli |
| 4,699,683 A | | 10/1987 | McCowin |
| 4,760,444 A | | 7/1988 | Nielson et al. |
| 4,780,262 A | | 10/1988 | Von Volkli |
| 4,790,898 A | | 12/1988 | Woods |
| 4,830,298 A | | 5/1989 | Van Blunk |
| 4,877,471 A | | 10/1989 | McCowin et al. |
| 4,941,182 A | | 7/1990 | Patel |
| 5,024,399 A | | 6/1991 | Barquet et al. |
| 5,058,497 A | | 10/1991 | Bishop et al. |
| 5,337,647 A | | 8/1994 | Roberts et al. |
| 5,439,549 A | | 8/1995 | Fryc et al. |
| 5,450,147 A | | 9/1995 | Dorsey-Palmateer |
| 5,540,126 A | | 7/1996 | Piramoon |
| 5,651,600 A | | 7/1997 | Dorsey-Palmateer |
| 5,683,646 A | | 11/1997 | Reiling, Jr. |
| 5,694,690 A | * | 12/1997 | Micale ....................... 29/897.2 |
| 5,700,337 A | | 12/1997 | Jacobs et al. |
| 5,746,553 A | | 5/1998 | Engwall |
| 5,804,276 A | | 9/1998 | Jacobs et al. |
| 5,814,386 A | | 9/1998 | Vasiliev et al. |
| 5,871,117 A | | 2/1999 | Protasov et al. |
| 5,963,660 A | | 10/1999 | Koontz et al. |
| 5,979,531 A | | 11/1999 | Barr et al. |
| 6,012,883 A | | 1/2000 | Engwall et al. |
| 6,013,341 A | | 1/2000 | Medvedev et al. |
| 6,045,651 A | | 4/2000 | Kline et al. |
| 6,074,716 A | | 6/2000 | Tsotsis |
| 6,086,696 A | | 7/2000 | Gallagher |
| 6,112,792 A | | 9/2000 | Barr et al. |
| 6,168,358 B1 | | 1/2001 | Engwall et al. |
| 6,205,239 B1 | | 3/2001 | Lin et al. |
| 6,276,058 B1 | * | 8/2001 | Gallinger et al. ............ 29/897.2 |
| 6,298,536 B1 | * | 10/2001 | Rossway et al. ............ 29/281.1 |
| 6,364,250 B1 | | 4/2002 | Brinck |
| 6,390,169 B1 | | 5/2002 | Johnson |
| 6,451,152 B1 | | 9/2002 | Holmes et al. |
| 6,480,271 B1 | | 11/2002 | Cloud et al. |
| 6,598,866 B2 | * | 7/2003 | Helm et al. ................... 269/21 |
| 6,648,273 B2 | | 11/2003 | Anast |
| 6,692,681 B1 | | 2/2004 | Lunde |
| 6,799,619 B2 | | 10/2004 | Holmes et al. |
| 2002/0141632 A1 | | 10/2002 | Engelbart et al. |

FOREIGN PATENT DOCUMENTS

| | | |
|---|---|---|
| DE | 10122092 A1 | 11/2002 |
| EP | 0507033 A1 | 10/1992 |
| FR | 2702982 A1 | 9/1994 |
| FR | 2788743 A1 | 7/2000 |
| GB | 572378 | 10/1945 |
| RU | 2042918 C1 | 8/1995 |

OTHER PUBLICATIONS

PCT Written Opininion for PCT/US05/42472, Aug. 2, 2007, The Boeing Company.

U.S. Appl. No. 10/851,381.

U.S. Appl. No. 10/846,974, filed May 14, 2004, Engelbart et al.

U.S. Appl. No. 10/822,538, filed Mar. 12, 2004, Engelbart et al.

U.S. Appl. No. 10/799,306, Engelbart et al.

U.S. Appl. No. 10/726,099, Engelbart et al.

U.S. Appl. No. 10/717,030, Johnson et al.

U.S. Appl. No. 10/664,148, Engelbart et al.

U.S. Appl. No. 10/646,509, Johnson et al.

U.S. Appl. No. 10/646,392, Engwall et al.

U.S. Appl. No. 10/646,316, New et al.

U.S. Appl. No. 10/630,594, Braun.

U.S. Appl. No. 10/628,691, Engelbart et al.

U.S. Appl. No. 10/301,949, Nelson.

U.S. Appl. No. 10/217,805, Engelbart et al.

U.S. Appl. No. 10/068,735, Engelbart et al.

http://www.cinmach.com/WolfTracks4_1/MTG_WT7.htm; Premier I Features Lighter, Stronger All-Composite Fuselage, 3 pages.

http://www.cinmach.com/compnews/PressReleeases/pr00-11.htm; Raytheon Aircraft Orders Four More Fiber Cincinnati Fiber Placement Systems for Industry's First Composite-Fuselage Business Jets, 2 pages.

http://www.rockymountaincomposites.com/wind_sys.htm; Filament Winding, 2 pages.

Fiedler, L., et al., *"Tango Composite Fuselage Platform"*, SAMPE Journal, vol. 39, No. 1, Jan./Feb. 2003, p. 60.

BAe 146, Flight International, May 2, 1981, 1 page.

A Barrelful of Experience, Intervia, May 1992, 2 pages.

Raytheon, Mar. 2000, vol. 4, No. 2, http:// www.cts.com/king/vasci/newsletter/vol42.html.

Business Aviation, Jun. 7, 2002, http://www.aviation.com/avnow/news/channel/busav.jsp?view=story&id=news/btoyo0607.xml.

Beechcraft's Composite Challenge, http://www.aerotalk.com/beech.cfm.

Evans, Don O., *"Fiber Placement"*, 3 pages, Cincinnati Machine, pp. 477-479.

Azco Corp., http://www.azcocorp.com/products/sur-cut-guillotine-knife-assemblies.php, "Sur-Cut™ Guillotine Knife Assemblies", 2004, Azco Corp., Fairfield, NJ, USA.

* cited by examiner

ONE-PIECE BARREL ASSEMBLY CART

CROSS REFERENCE TO RELATED APPLICATIONS

The present application is related to the following co-pending U.S. patent applications: U.S. application Ser. No. 10/851,381, filed May 20, 2004; U.S. application Ser. No. 10/822,538, filed Apr. 12, 2004; U.S. application Ser. No. 10/717,030, filed Nov. 18, 2003; U.S. application Ser. No. 10/646,509, filed Aug. 22, 2003; U.S. application Ser. No. 10/646,392, filed Aug. 22, 2003; U.S. application Ser. No. 10/646,316, filed Aug. 22, 2003; U.S. application Ser. No. 10/630,594, filed Jul. 28, 2003; and U.S. application Ser. No. 10/301,949, filed Nov. 22, 2002.

BACKGROUND OF THE INVENTION

The present invention generally relates to assembly fixtures and, more particularly, to an assembly cart for a large one-piece composite fuselage barrel and to a method for stabilizing large cured composite fuselage barrels.

In recent years, Boeing Commercial Airplanes has focused its new airplane product development efforts on the Boeing 7E7, a super-efficient airplane. In addition to bringing big-jet ranges to mid-size airplanes, the 7E7 will provide airlines with unmatched fuel efficiency, resulting in exceptional environmental performance. The airplane may use 20 percent less fuel for comparable missions than any other wide-body airplane. Furthermore, the airplane will be able to travel at speeds similar to today's fastest wide bodies, about Mach 0.85. Still further, the wide body aircraft 7E7 may provide 40 to 60 percent more cargo revenue capacity. The key to this exceptional performance is a suite of new technologies being developed by Boeing and its international technology development team. For example, the majority of the primary structure, including the fuselage and wing, on the 7E7 will be made of composite materials. Construction materials may be used (by weight) as follows: about 57% composite materials, about 24% aluminum, about 11% titanium, and about 8% steel. By volume, the 7E7 will be about 80% composite materials. Composite materials are significantly lighter than traditional aircraft materials, such as aluminum and aluminum alloys, titanium and titanium alloys, and steel. The use of composite materials will make the 7E7 a very light aircraft for its capabilities.

Since composite materials have material characteristics that differ from traditional aircraft materials it will not be possible to use existing facilities and equipment for the construction and assembly of the 7E7. For example, the large fuselage sections that will be made out of a composite material and which will have a one-piece barrel shape will be built on an inner mold line mandrel. After curing of the composite material, such as a graphite/epoxy, the inner mold line mandrel needs to be removed. The fuselage sections will be approximately 24 feet long and will have a diameter of about 19.5 feet and, therefore, are quite large. Furthermore, composite material in post-cure condition is not as stiff as traditional material, such as aluminum or titanium and their alloys, used to build fuselage sections. Furthermore, composite material in post cure condition will not be stiff enough to be moved around. Therefore, a large fuselage barrel having a diameter of about 19 feet and a length of at least 24 feet would collapse under its own weight if the inner mold line mandrel were to be removed without stabilizing or holding the fuselage barrel. Currently, no equipment exists that could hold or carry such large structure as the fuselage barrel of the 7E7.

Furthermore, the 7E7 will consist of at least of 3 fuselage sections that need to be joined with each other. In order to join two adjacent fuselage barrels, the barrels will need to be moved toward each other and the barrels also will need to be aligned. Currently no equipment exists that would allow the transport and alignment of the large fuselage barrels. Since the different fuselage sections of a large new generation aircraft, such as the 7E7, for example, the aft section, the center section, and the forward section, will not have the same size, shape and fuselage features, equipment for carrying and holding these fuselage sections is needed that may be easily adjusted to the features of each fuselage section.

As can be seen, there is a need for developing new equipment that is able to stabilize, hold, and carry large fuselage barrels without frames having a diameter of about 19 feet and a length of more than 24 feet, such as the fuselage barrels of the 7E7 airplane. Furthermore, there is a need to prevent large one-piece composite fuselage barrels, such as the fuselage barrels of the 7E7, from collapsing under their own weight during removal of the inner mold line mandrel. Also, there is a need to provide new equipment for holding and carrying large fuselage barrels, such as the fuselage barrels of the 7E7, that may be easily adjusted to the size and shape of the fuselage barrel. Moreover, there is a need to provide equipment that allows the joining of adjacent fuselage barrels having a diameter of about 19 feet and a length of more than 24 feet.

There has, therefore, arisen a need to provide an assembly structure for large one-piece composite fuselage barrels having a diameter of about 19 feet and a length of more than 24 feet. There has further arisen a need to provide an assembly structure that has modular components, which are easily adjustable to the shape and size of a large one-piece composite fuselage barrel. There has still further arisen a need to provide a method for stabilizing large cured composite fuselage barrels.

SUMMARY OF THE INVENTION

The present invention provides an assembly cart for a one-piece composite fuselage barrel having a diameter of about 19 feet and a length of more than 24 feet, and a method for stabilizing large one-piece composite fuselage barrels. The present invention further provides a fixture consisting of multiple ring assemblies that may be suitable for, but not limited to, securing a large one-piece fuselage barrel shell made out of a composite material of a large new generation aircraft, such as the Boeing 7E7 airplane. The present invention still further provides a modular assembly system that includes assembly fixtures that may be easily adjusted to the size and shape of the one-piece composite fuselage barrel.

In one aspect of the present invention, a one-piece barrel assembly cart comprises a right assembly cart base having an inner surface, a left assembly cart base having an inner surface, at least two stabilizer rings, and a plurality of clamps. The left assembly cart base is connected with the right assembly cart base at the inner surfaces. Each stabilizer ring is divided into a right half and a left half. The right half is attached to the right assembly cart base and the left half is attached to the left cart base. The clamps are attached to the stabilizer rings.

In another aspect of the present invention, a post-cure assembly cart comprises a track, a right sliding base positioned on the track, a left sliding base positioned on the track opposite from the right sliding base, a stabilizer ring having an inner surface and an outer surface and including a right half and a left half, and a plurality of clamps attached to the inner surface of the stabilizer ring. The right half of the stabilizer ring is attached to the right sliding base and the left half of the stabilizer ring is attached to the left sliding base.

In still another aspect of the present invention, a modular assembly cart comprises a first module including a first cart base and a first stabilizer ring, a second module including a second cart base and a second stabilizer ring, and a third module including a third cart base and a third stabilizer ring. The second cart base is connected with the first cart base. The third cart base is connected with the second cart base.

In a further aspect of the present invention, a modular assembly cart comprises a first module and a second module. The first module includes a cart base having a front, a back, a top and a bottom, two rails located at the top of the cart base and extending longitudinally from the front to the back at opposite sides, a stabilizer ring having a lower half and an upper half, and a fuselage support installed on top of the cart base. The lower half is mounted on the rails proximate to the front of the cart base and the upper half is detachable from the lower half of the stabilizer ring. The second module is connected with the first module. The second module is identical with the first module. The back of second module is attached to the back of the first module.

In still a further aspect of the present invention, a post-cure assembly cart for a fuselage barrel of the aft section of an airplane comprises a right assembly cart base, a plurality of casters attached to the bottom and evenly distributed along the outer surface and the inner surface of the right assembly cart base and of the left assembly cart base, a plurality of support jack assemblies attached to the bottom and evenly distributed along the outer surface and the inner surface of the right assembly cart base and of the left assembly cart base, a plurality of pitch and yaw jack assemblies attached to the bottom and evenly distributed along the outer surface and the inner surface of the right assembly cart base and of the left assembly cart base, three ring guides being in a fixed connection with the outer surface of the right assembly cart base, three ring guides being in a fixed connection with the outer surface of the left assembly cart base, three stabilizer rings, a plurality of clamps being attached to the inner surface of the stabilizer rings, and a plurality of ring support jack assemblies mounted underneath each of the stabilizer rings. The right assembly cart base includes an inner surface, an outer surface, and a bottom. The left assembly cart base includes an inner surface, an outer surface, and a bottom. The left assembly cart base has the same dimensions as the left assembly cart base. The left assembly cart base is connected with the right assembly cart base at the inner surfaces. Each stabilizer ring has an inner surface and an outer surface. Each stabilizer ring is divided into a right half and a left half. The right half of each stabilizer ring is attached to one of the ring guides of the right assembly cart base. The left half of each stabilizer ring is attached to one of the ring guides of the left cart base. The right half and the left half of the stabilizer ring are detachable. The outer surface of each of the three stabilizer rings has the same diameter. The inner surface of a first stabilizer ring has a first diameter. The inner surface of a second stabilizer ring has a second diameter. The inner surface of a third stabilizer ring has a third diameter.

In still another aspect of the present invention, a method for stabilizing a cured composite fuselage barrel comprises the following steps: providing an assembly cart supporting at least two stabilizer rings including a plurality of clamps, a first half, and a second half; opening the stabilizer rings by detaching the first half of each of the stabilizer rings from the second half; inserting a fuselage barrel into the stabilizer rings; closing the stabilizer rings by connecting the first half of each of the stabilizer rings with the second half; and actuating clamps and attaching the fuselage barrel to the stabilizer rings.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The Boeing Company is exploring a variety of methods and tools for making large composite structures. The present application describes an invention that is one of a family of inventions for accomplishing this goal. The present application is related to the following co-pending U.S. patent applications that are part of this family: U.S. application Ser. No. 10/851,381, filed May 20, 2004, entitled "Composite Barrel Sections for Aircraft Fuselages and Other Structures, and Methods and Systems for Manufacturing such Barrel Sections"; U.S. application Ser. No. 10/822,538, filed Apr. 12, 2004, entitled "Systems and Methods for Using Light to Indicate Defect Locations on a Composite Structure"; U.S. application Ser. No. 10/717,030, filed Nov. 18, 2003, entitled "Method of Transferring Large Uncured Composite Laminates"; U.S. patent application Ser. No. 10/646,509, entitled "Multiple Head Automated Composite Laminating Machine For The Fabrication Of Large Barrel Section Components", filed Aug. 22, 2003; U.S. patent application Ser. No. 10/646,392, entitled "Automated Composite Lay-Up To An Internal Fuselage Mandrel", filed Aug. 22, 2003; U.S. patent application Ser. No. 10/646,316, entitled "Unidirectional, Multi-Head Fiber Placement", filed Aug. 22, 2003; U.S. patent application Ser. No. 10/630,594, entitled "Composite Fuselage Machine", filed Jul. 28, 2003; and U.S. patent application Ser. No. 10/301,949, entitled "Parallel Configuration Composite Material Fabricator", filed Nov. 22, 2002; all of which are assigned to the assignee of the present invention and all of which are hereby incorporated by reference into the present application.

Broadly, an embodiment of the present invention provides an assembly cart for a one-piece composite fuselage barrel that may stabilize a large cured composite fuselage barrel, for example, having a diameter of about 19 feet and a length of more than 24 feet. Since prior art fuselage barrels of traditional aircraft are typically not made out of composite materials or have a smaller size, no assembly fixture exists that may be used to assemble such a large cured composite fuselage structure. The post-cure assembly cart as in one embodiment of the present invention may be used for, but is not limited to, the assembly of large one-piece fuselage barrels of new generation aircraft such as the Boeing 7E7 airplane. Furthermore, by providing a cart base that includes casters and jack assemblies, the assembly cart as in one embodiment of the present invention may be used to mate adjacent large composite fuselage barrels. By providing modular assembly carts as in one embodiment of the present invention, the assembly cart may be used for other applications in the aerospace industry or other industries where it may be necessary to provide stabilization to large cured composite structures.

In one embodiment, the present invention provides a post-cure assembly cart including rings that may be able to provide support for a tapered one-piece fuselage barrel. The rings may be dimensioned to fit around the fuselage barrel. Still further, the size of the rings and the number of the rings used to support a fuselage barrel may be selected according to the shape and the size of the fuselage barrel. Therefore, the assembly cart as in one embodiment of the invention may be used to assemble aft, center, and forward sections of a large fuselage. Furthermore, the assembly cart may split left/right for easy loading of the large fuselage barrel. Currently no structure exists that would fit around a large one-piece fuselage barrel having a diameter of about 19 feet and a length of more than 24 feet, for example, a fuselage barrel of a Boeing 7E7 airplane.

An embodiment of the present invention further provides a plurality of force limiting vacuum toggle clamps that may be positioned on the inside of each ring and around the diameter of each ring. The purpose of the clamps may be to support and stabilize the large fuselage barrel. Cured composite material, such as graphite/epoxy, that the fuselage barrel, for example, the fuselage barrel of a Boeing 7E7 airplane may be made of, may not be as stiff as typical prior art fuselage barrel materials. Furthermore, fuselage barrels having a diameter of about 19 feet and a length of more than 24 feet may be larger than any prior art composite fuselage barrel. Therefore, the clamps are needed to prevent the large composite fuselage barrel from collapsing under its own weight. After clamping, the large composite fuselage barrel having a diameter of about 19 feet and a length of more than 24 feet will be stabilized and it may now be possible to disassemble large and heavy mandrel sections, to conduct non-destructive testing of the barrel shell, to install fuselage barrel frames and a floor, and to machine the shell as needed. Once the cured fuselage barrel is clamped to the rings, it may be rotated allowing access to different areas of the fuselage barrel, for example for assembling, machining, or inspection. In prior art, no fixture exists that would be able to provide support and rotation capability to a large cured composite structure, such as a one-piece fuselage barrel of a Boeing 7E7 airplane.

An embodiment of the present invention further provides a cart base including casters and jack assemblies. The casters and jack assemblies may be used to lift the assembly cart as in one embodiment of the present invention above the ground for easy access, to move the assembly cart on the factory floor, and to mate a fuselage barrel with an adjacent fuselage barrel. Currently no fixture exists that would allow movement and alignment of large one-piece composite fuselage barrels, such as the Boeing 7E7 fuselage barrels.

An embodiment of the present invention further provides a modular assembly cart. By providing a variety of modules, an assembly cart may be put together according to the shape and size of the cured composite structure that needs to be stabilized. The cured composite structure may be a large one-piece fuselage barrel of an aft, center, or front section having a diameter of about 19 feet and a length of more than 24 feet, for example, of a Boeing 7E7 airplane. Since the modules may be put together as needed, the assembly cart as in one embodiment of the present invention may be used universally.

Figure 1:
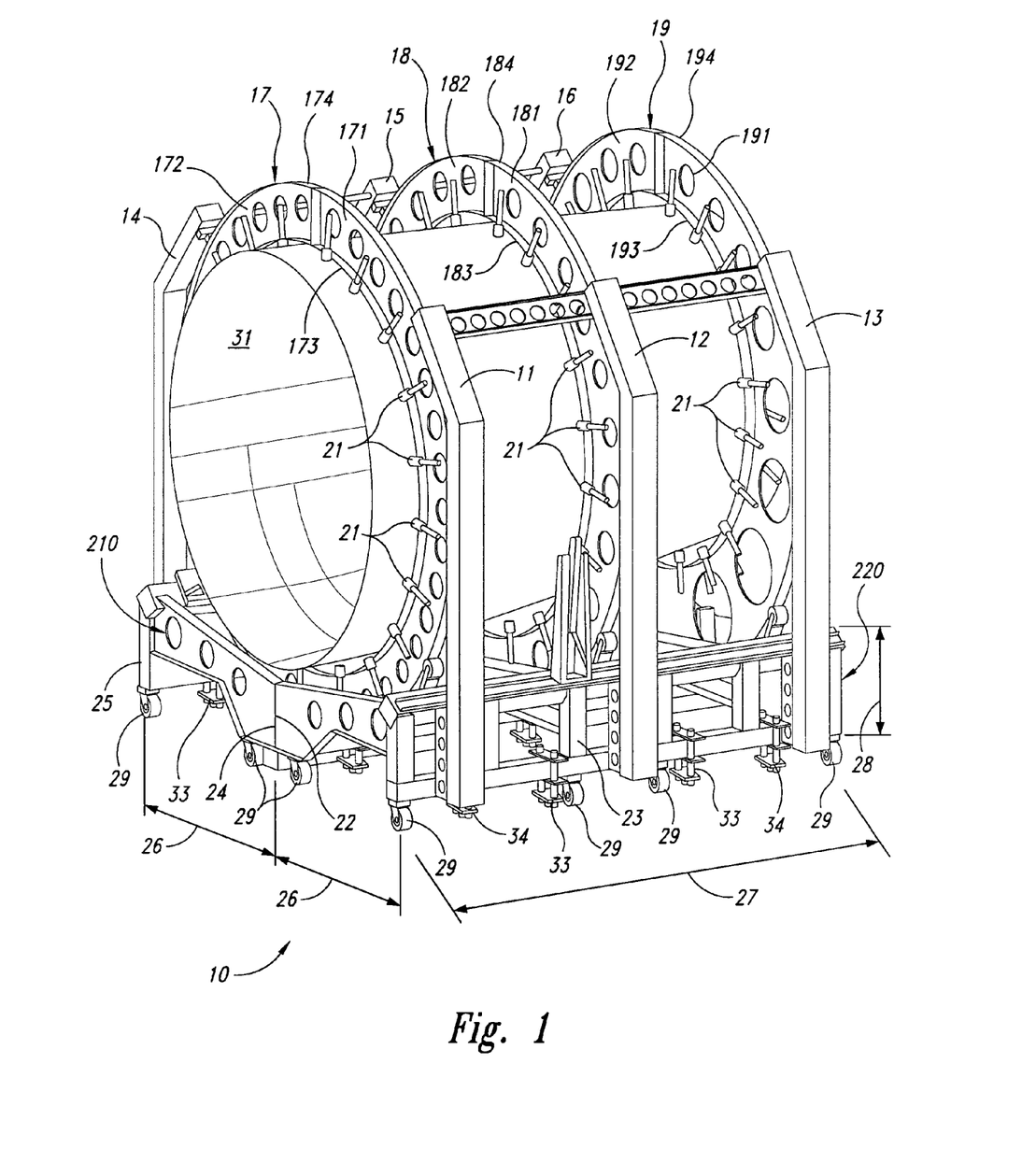
FIG. 1 is a perspective side view of a post-cure assembly cart according to one embodiment of the present invention.

Referring now to FIG. 1, a perspective side view of a post-cure assembly cart 10 is illustrated according to one embodiment of the present invention. The assembly cart 10 may include a left assembly cart base 220, a right cart base 210, a ring guide 11, a ring guide 12, a ring guide 13, a ring guide 14, a ring guide 15, a ring guide 16, a stabilizer ring 17, a stabilizer ring 18, a stabilizer ring 19, and a plurality of clamps 21. A fuselage barrel 31 may be stabilized with the assembly cart 10. The fuselage barrel 31 may be a one-piece barrel. The left assembly cart base 220 may have an inner surface 22 and an outer surface 23. The ring guide 11, the ring guide 12, and the ring guide 13 may be in a fixed connection with the outer surface 23 of the left cart base 220. The ring guide 11 may be located at one end of the left cart base 220, the ring guide 12 may be located in the center of the left cart base 220, and the ring guide 13 may be located at the opposite end of the left cart base 220. The right assembly cart base 210 may have an inner surface 24 and an outer surface 25. The ring guide 14, the ring guide 15, and the ring guide 16 may be in a fixed connection with the outer surface 25 of the right cart base 210. The ring guide 14 may be located at one end of the right cart base 210, the ring guide 15 may be located in the center of the right cart base 210, and the ring guide 16 may be located at the opposite end of the right cart base 210.

The stabilizer ring 17 may be divided into a left half 171 and a right half 172. The stabilizer ring 18 may be divided into a left half 181 and a right half 182. The stabilizer ring 19 may be divided into a left half 191 and a right half 192. The left half 171 of the stabilizer ring 17 may be attached to the ring guide 11 and the right half 172 of the stabilizer ring 17 may be attached to the ring guide 14. The left half 181 of the stabilizer ring 18 may be attached to the ring guide 12 and the right half 182 of the stabilizer ring 18 may be attached to the ring guide 15. The left half 191 of the stabilizer ring 19 may be attached to the ring guide 13 and the right half 192 of the stabilizer ring 19 may be attached to the ring guide 16. The stabilizer ring 17 may have an inner surface 173 and an outer surface 174. The stabilizer ring 18 may have an inner surface 183 and an outer surface 184. The stabilizer ring 19 may have an inner surface 193 and an outer surface 194. The diameter of the outer surfaces 174, 184, and 194 of the stabilizer rings 17, 18, and 19, respectively, may be the same. The diameter of the inner surface 173 may differ from the diameter of the inner surface 183 and the diameter of both inner surfaces 173 and 183 may further differ from the diameter of the inner surface 193. The diameters of the inner surfaces 173, 183, and 193 may be selected according to the size of the fuselage barrel 31 such that the inner surfaces 173, 183, and 193 may fit around the fuselage barrel 31. The fuselage barrel 31 may have a diameter of at least 19 feet. For example, as shown in FIG. 1, the aft section of a fuselage—such as that of the Boeing 7E7 fuselage—may be tapered. Therefore, the diameter of the inner surface 173 of the stabilizer ring 17 may be smaller than the diameter of the inner surface 183 of the stabilizer ring 18, and the diameter of the inner surface 183 of the stabilizer ring 18 may be smaller than the diameter of the inner surface 193 of the stabilizer ring 19. Furthermore, the inner surfaces 173, 183, and 193 of the stabilizer rings 17, 18, and 19, respectively, may not be a circle but a contour defined by the fuselage shape. The stabilizer rings 17, 18, and 19 may have a width (in longitudinal direction) of no more than eight inches. A plurality of clamps 21 may be attached to the inner surface 173 of ring 17, to the inner surface 183 of ring 18, and to the inner surface 193 of ring 19. The total number of locations for clamps 21 for each stabilizer ring 17, 18, and 19 to hold the fuselage barrel 31 should be preferably no less than 41 or coincide with the number of stringers in the fuselage 31.

The left cart base 220 may have the same width 26 and the same length 27 as the right cart base 210. The width 26 of the right cart base 210 and of the left cart base 220 may be selected such that once the inner surface 22 of the left cart base is connected with the inner surface 24 of the right cart base 210 (as shown in FIG. 1) the left halves 171, 181, and 191 of the stabilizer rings 17, 18, and 19, respectively, are joined with the right halves 172, 182, and 192 of the stabilizer rings 17, 18, and 19, respectively. The left half 171 and the right half 172 may be joined together to form the stabilizer ring 17 using a clamping device that may be closed and opened as needed. The same applies to the stabilizer rings 18 and 19. The length 27 of the left cart base 220 and of the right cart base 210 may be selected according to the length of the fuselage barrel 31 to be stabilized. The fuselage barrel 31 may have a length of at least 24 feet. The left cart base 220 may have the same height 28 as the right cart base 210. The height 28 may be selected according to the height above the factory floor required for the assembly of the fuselage barrel 31.

The fuselage barrel 31, as shown in FIG. 1, may be a tapered barrel of the aft section of a large aircraft, such as a Boeing 7E7 airplane. The barrel 31 may be made out of a composite material, for example, graphite/epoxy that has been cured. The fuselage barrel 31 may measure about 24 feet in length (expansion in longitudinal direction) and may have a diameter of about 19.5 feet. The full sized fuselage barrel 31 may be built in one piece on an inner mold line mandrel. Multiple plies of graphite tape BMS8-276, grade 190 may be used for the layup. Furthermore, the fuselage barrel 31 may include stringers (not shown) that work as longitudinal stiffeners. The clamps 21 may be positioned on the stabilizer rings 17, 18, and 19 such that each clamp 21 may be attached to the outside of the fuselage barrel 31 at the position of a longitudinal stiffener. In order to install the fuselage barrel 31 on the post-cure assembly cart 10, the left cart base 220 may be positioned apart from the right cart base 210 leaving enough space to bring in the fuselage barrel 31. The fuselage barrel 31 may be positioned within the right halves 172, 182, and 192, of the stabilizer rings 17, 18, and 19, respectively. Then the left cart base 220 may be moved towards the right cart base 210 until the inner surface 22 of the left cart base 220 meets the inner surface 24 of the right cart base 24. The stabilizer rings 17, 18, and 19 may be closed. The stabilizer ring 18 may be positioned in the center of the fuselage barrel 31. The stabilizer rings 17 and 19 may be positioned on opposite sides of the stabilizer ring 18 having the same distance to the stabilizer ring 18. Preferably, the stabilizer rings 17 and 18 may be positioned close to each end of the fuselage barrel 31.

Now the clamps 21 may be actuated to attach to the outside of the fuselage barrel 31. The clamps 21 may be, for example, automatically actuated, force limiting vacuum toggle clamps that may be able to hold the fuselage barrel. Such clamps 21 may have the ability to clamp at a new position without manual adjustment or excessive force on the fuselage barrel 31. After clamping the fuselage barrel 31 to the stabilizer rings 17, 18, and 19, the fuselage barrel 31 may be rotated. By clamping the fuselage barrel 31 to the stabilizer rings 17, 18, and 19, the cured composite fuselage barrel 31 may be stabilized in order to perform tasks, such as disassembly and removal of the layup mandrel segments, non-destructive inspection of the cured fuselage barrel 31, installation of interior fuselage structures, or joining one assembled fuselage section to another.

Figure 2:
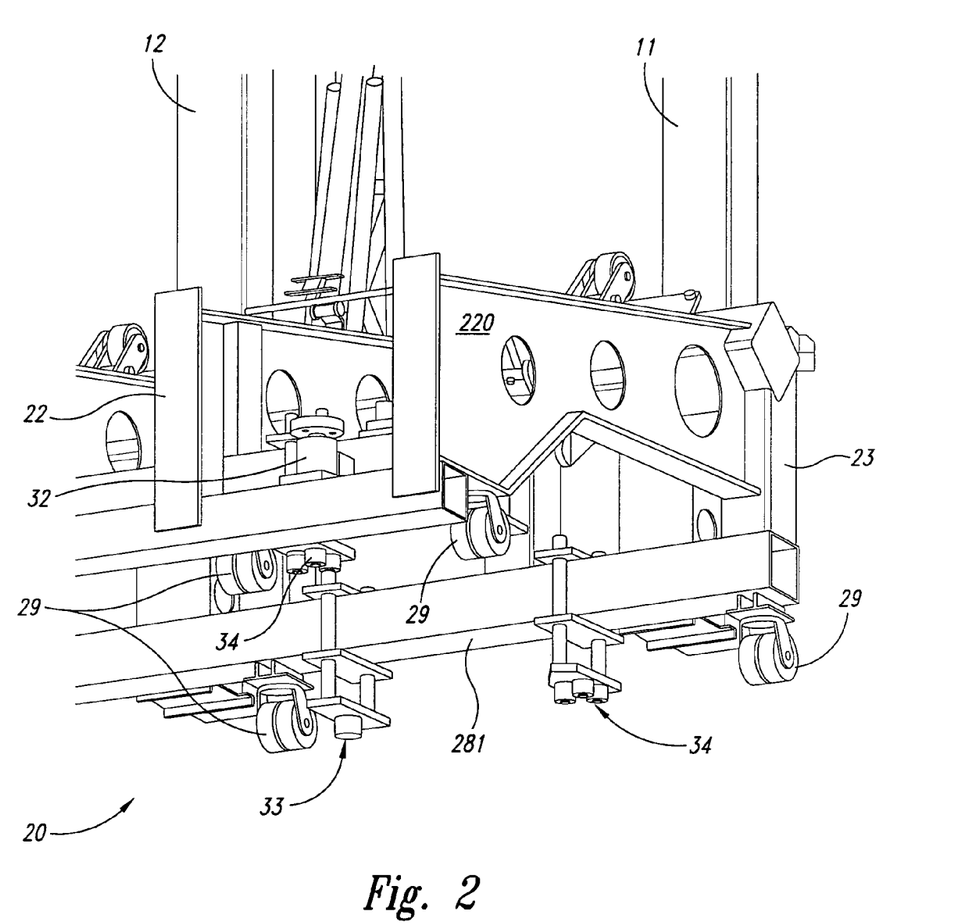
FIG. 2 is a perspective side view of a detail of an assembly cart base according to one embodiment of the present invention.

Referring now to FIG. 2, a detail 20 of an assembly cart base 220 is illustrated according to one embodiment of the present invention. The assembly cart base 220 may include casters 29, ring support jack assemblies 32, support jack assemblies 33, and pitch and yaw jack assemblies 34. The casters 29 may be attached to the bottom 281 of the cart base 220. The casters 29 may be distributed evenly in longitudinal direction next to the outer surface 23 and next to the inner surface 22. The casters 29 may swivel and may be used to move the cart base 220 along the factory floor. This may enable the insertion of the fuselage barrel 31 in the stabilizer rings 17, 18, and 19, as shown in FIG. 1. The ring support jack assembly 32 may be attached to the cart base 220 underneath the stabilizer rings 17, 18, and 19. The ring support jack assembly 32 may enable alignment and rotation of the stabilizer rings 17, 18, and 19 (shown in FIG. 1). The support jack assemblies 33 may be attached to the bottom 281 of the cart base 220. The support jack assemblies 33 may be positioned next to the outer surface 23 and next to the inner surface 22. The support jack assemblies 33 may provide up and down movement of the cart base 220 and, therefore, of the assembly cart 10 shown in FIG. 1. The support jack assemblies 33 may be hydraulic actuators. The pitch and yaw jack assemblies 34 may be attached to the bottom 281 of the cart base 220 and may be positioned next to the outer surface 23 and next to the inner surface 22. The pitch and yaw jack assemblies 34 may be used to align the fuselage barrel 31 (shown in FIG. 1) for mating with an adjacent fuselage barrel.

Figure 3:
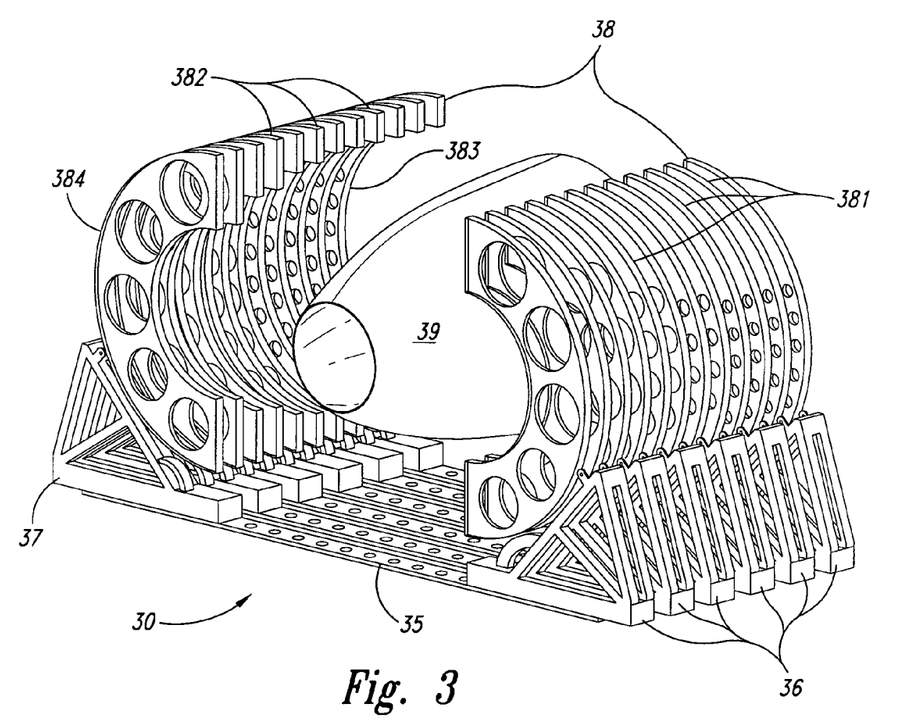
FIG. 3 is a perspective front view of a sliding base post-cure assembly cart according to one embodiment of the present invention.

Referring now to FIG. 3, a perspective front view of a sliding base post-cure assembly cart 30 is illustrated according to one embodiment of the present invention. The sliding base assembly cart 30 may include a track 35, a left sliding base 36, a right sliding base 37, a left half 381 of a stabilizing ring 38, and a right half 382 of a stabilizing ring 38. The left sliding base 36 and the right sliding base 37 may be positioned on opposite ends of the track 35. The left half 381 of the stabilizer ring 38 may be attached to the left sliding base 36. The right half 382 of the stabilizer ring 38 may be attached to the right sliding base 37. Before assembling the stabilizer ring 38, a fuselage barrel 39 may be positioned between the right half 382 and the left half 381 of the stabilizer ring 38. After sliding the left sliding base 36 and the right sliding base towards the center of the track 35, the right half 382 and the left half 381 form the stabilizer ring 38. The stabilizer ring 38 may be dimensioned to surround the fuselage barrel 39. The stabilizer ring 38 may have an inner surface 383 and an outer surface 384. Clamps 21, as shown in FIG. 1, may be attached to the inner surface 383 and may be used to clamp the fuselage barrel 39 to the stabilizer ring 38. A plurality of left sliding bases 36 and a plurality of right sliding bases 37 may be positioned on a plurality of tracks 35. The total number of left sliding bases 36 equals the total number of right sliding bases 37 and the total number of tracks 35. Each right sliding base 37 has a right half 382 of a stabilizer ring 38 attached, and each left sliding base 36 has a left half 381 of a stabilizer ring 38 attached. The tracks 35 may be connected to expand in longitudinal direction, as shown in FIG. 3. The diameter of the outer surface of all stabilizer rings 38 may be equal. The diameter of the inner surface 383 of each stabilizer ring 38 may be different and may depend on the size and shape of the fuselage barrel 39. For example, FIG. 3 illustrates a large fuselage barrel 39 of a front section of a new generation aircraft, such as the Boeing 7E7 airplane. As can be seen, the inner diameter of the inner surface 383 of the stabilizer ring 38 increases from the front to the back in longitudinal direction while the diameter of the outer surface 384 of the stabilizer ring stays the same. Consequently, the sliding base assembly cart may be assembled as needed to stabilize any shape of a large one-piece cylindrical cured composite structure, for example, the front fuselage barrel 39 of a large new generation aircraft, such as the Boeing 7E7 airplane.

Figure 4:
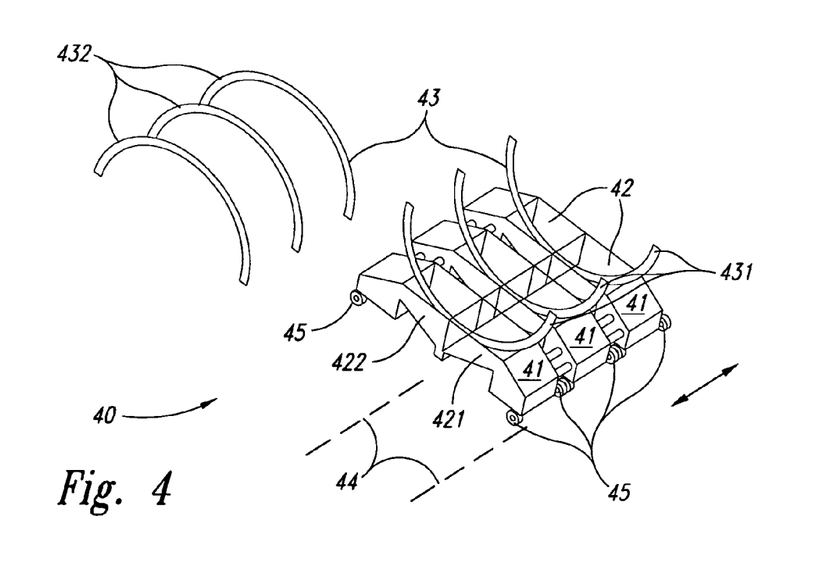
FIG. 4 is a perspective top view of a three-ring modular assembly cart according to one embodiment of the present invention.

Referring now to FIG. 4, a perspective top view of a three-ring modular assembly cart 40 is illustrated according to one embodiment of the present invention. The three-ring modular assembly cart 40 may include three identical modules 41. Each of the three modules 41 may include a cart base 42 and a stabilizer ring 43. The stabilizer ring 43 may include a lower half 431 and an upper half 432. The lower half 431 may be attached to the cart base 42 such that the opening of the lower half 431 of the stabilizer ring 43 points upwards. The cart base may include V-groove wheels 45 and jack assemblies 32, 33, and 34 as shown in FIG. 2 and as discussed above. The three modules 41 may be connected to form the modular assembly cart 40. The modular assembly cart 40 may be movable on V-tracks 44. A large one-piece fuselage barrel, for example, the fuselage barrel 31 having a diameter of about 19 feet and a length of more than 24 feet, may be inserted into the lower halves 431 of the stabilizer ring 43. Following this, the upper halves 432 of the stabilizer ring 43 may be attached to the lower halves 431 of the stabilizer rings 43. The stabilizer rings 43 may include a plurality of clamps 21, as shown in FIG. 1, to clamp the fuselage barrel, such as the fuselage barrel 31, to the stabilizer ring 43. Once the upper halves 432 of the stabilizer rings 43 are attached to the lower halves 431, the stabilizer rings 43 and, therefore, the fuselage barrel (31), may be rotated. Each cart base 42 may have a split design and may include a right half 421 and a left half 422 as shown in FIG. 4. After a 90-degree rotation of the stabilizer rings 43, it may be possible to unlock the right half 421 and the left half 422 of the cart base 42 and to move the right half 421 and the left half 422 apart. If needed, for example, for a fuselage barrel having a greater length compared to the fuselage barrel 31, more than 3 modules 41 could be used to form the modular assembly cart.

Figure 5:
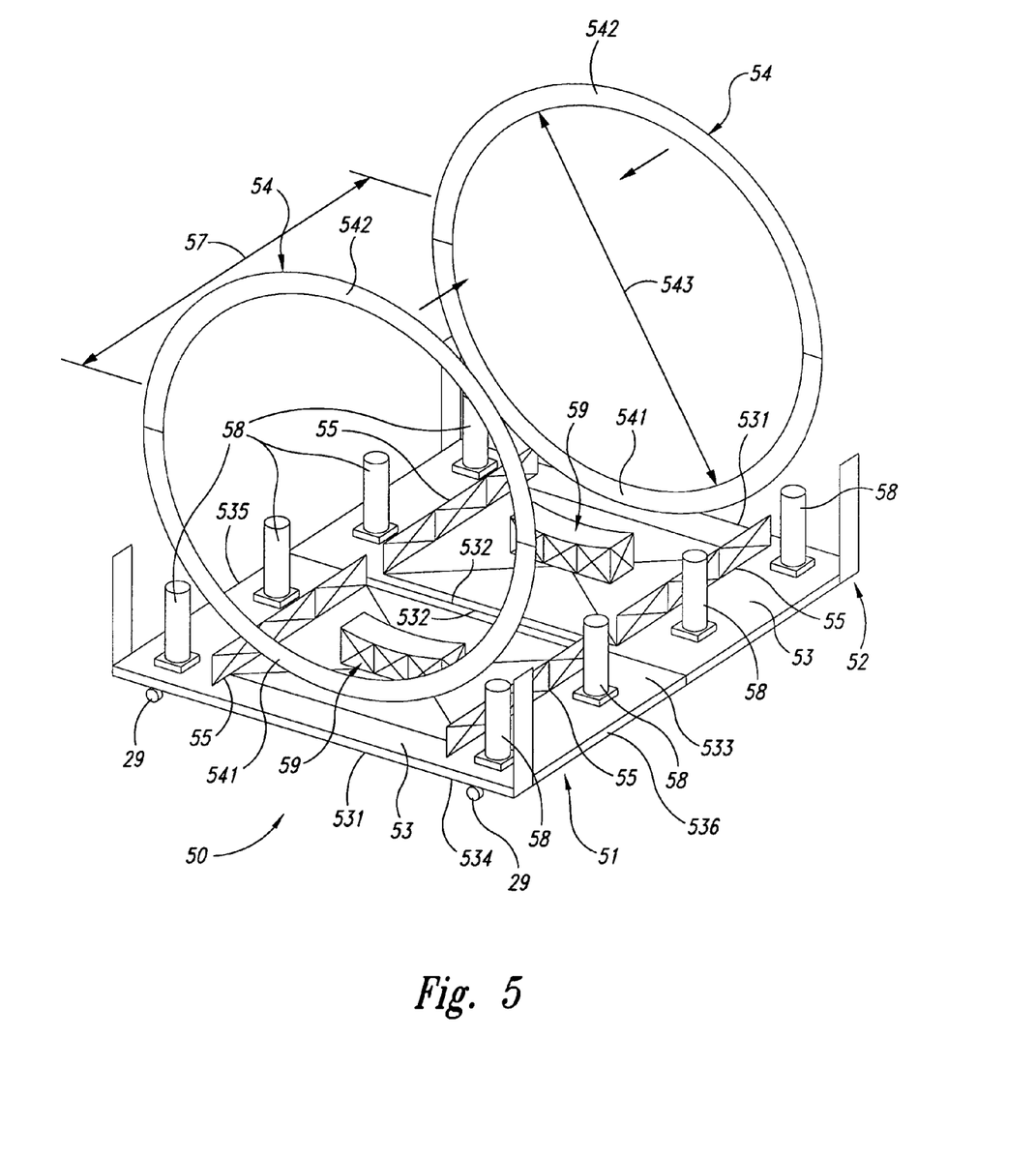
FIG. 5 is a perspective front view of a two-ring modular assembly cart according to one embodiment of the present invention.

Referring now to FIG. 5, a perspective front view of a two-ring modular assembly cart 50 is illustrated according to one embodiment of the present invention. The two-ring modular assembly cart 50 may include a module 51 and a module 52. Module 51 and module 52 may be identical. Both module 51 and module 52 may include a cart base 53 and a stabilizer ring 54.

The cart base 53 may have a front 531, a back 532, a top 533, a bottom 534, a left side 535, and a right side 536. The cart base 53 may further include two rails 55. The two rails 55 may be located at the top 533 and may extend longitudinally along the left side 535 and along the right side 536 of the cart base 53, as shown in FIG. 5. The cart base 53 may further include at least four casters 29 (also shown in FIG. 2) mounted to the bottom 534 of the cart base 53. One casters 29 may be positioned at the left side 535 close to the front 531, another caster 29 may be positioned at the left side 535 close to the back 532, another caster 29 may be positioned at the right side 536 close to the front 531, and another caster 29 may be positioned at the right side 536 close to the back 532. The casters 29 may swivel and may be used to move the module 51 or the module 52 along the factory floor. The cart base 53 may further include at least four jacking cylinders 58. The jacking cylinders 58 may provide vertical translation of the module 51 and the module 52. One jacking cylinder 58 may be positioned at the left side 535 close to the front 531, another jacking cylinder 58 may be positioned at the left side 535 close to the back 532, another jacking cylinder 58 may be positioned at the right side 536 close to the front 531, and still another jacking cylinder 58 may be positioned at the right side 536 close to the back 532. The jacking cylinders 58 may be used to move the cart base 53 vertically up and down. The jacking cylinders 58 may need to be operated in concert such that the fuselage barrel 56 may not be overly stressed while being moved. The waterline plane of the fuselage barrel 56 should not be distorted while being supported by the stabilizer rings 54. The cart base 53 may further include a fuselage support 59. The fuselage support 59 may be installed at the top 533 of the cart base 53. The fuselage support 59 may further be preferably installed at about 5 feet from the front 531 of the cart base 53 and, therefore, inboard of the inside position of the stabilizer ring 54. The fuselage support 59 may be installed such that it may not be in position while the fuselage barrel 56 is loaded into the stabilizer rings 54 or rotating under control of the stabilizer rings 54. Furthermore, the fuselage support 59 may be raised into position to support the fuselage barrel 56 after loading or rotation is completed. The fuselage support 59 may be raised into position in a controlled manner, for example, with load cell indication. The fuselage support 59 may be designed such that it may adapt to a variety of curvatures of fuselage barrels 56. The surface contact area of the fuselage support 59 with the skin of the fuselage barrel 56 may be such that the elastic limit of the fuselage barrel 56 with frames installed is not exceeded when the fuselage support 59 is supporting the full weight of the fuselage barrel 56 during, for example, repositioning of one of the stabilizer rings 54. For example, the fuselage support 59 may be a roller design as shown in FIGS. 5 and 6 or a strap design as shown in FIG. 7.

Figure 5A:
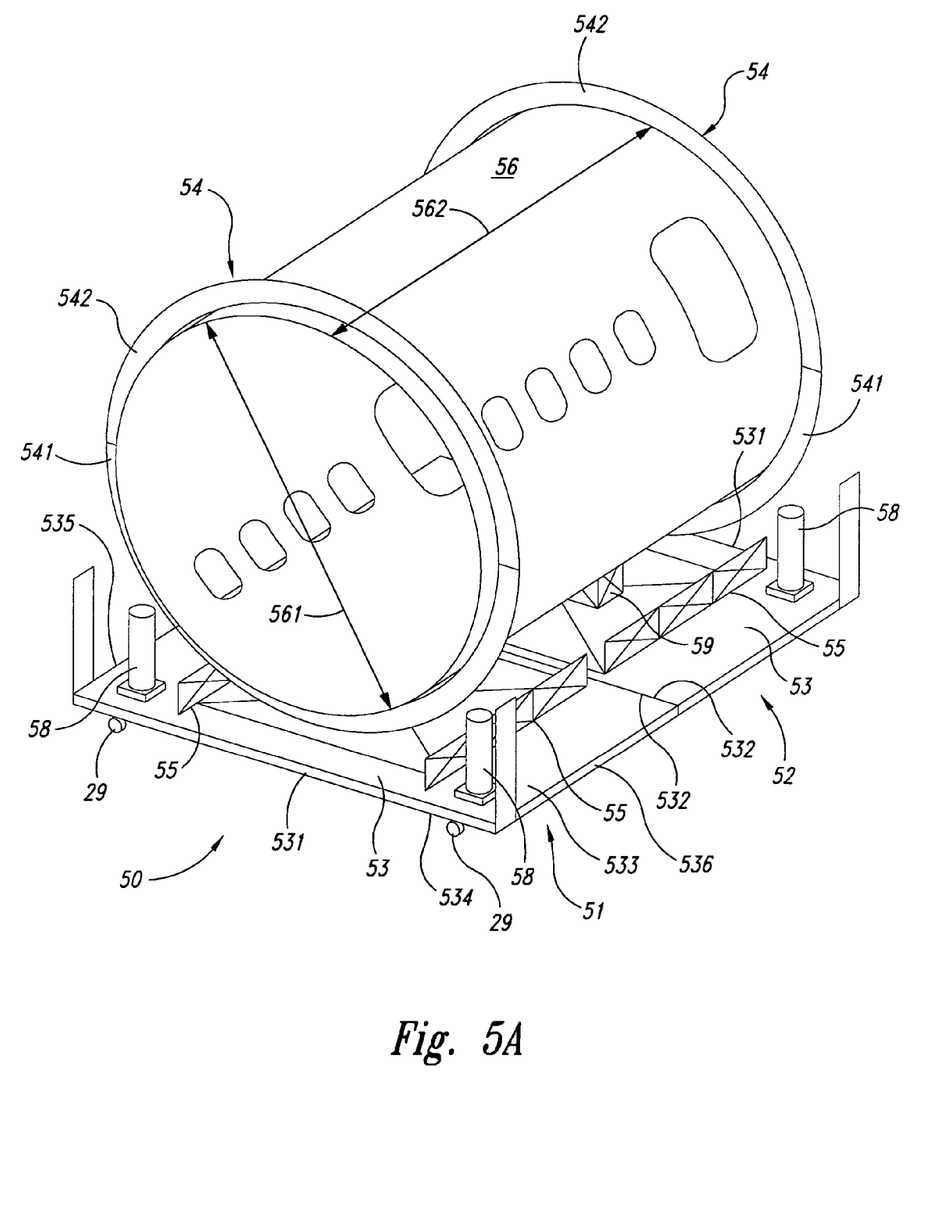
FIG. 5a is a perspective front view of a two-ring modular assembly cart according to another embodiment of the present invention.

The stabilizer ring 54 may include a lower half 541 and an upper half 542. The lower half 541 of the stabilizer ring 54 may be positioned next to the front 531 of the cart base 53. The upper half 542 is detachable from the lower half 531 of the stabilizer ring 53. The upper half 542 of the stabilizer ring 54 may be attached to the lower half 541 after insertion of a fuselage barrel 56 (shown in FIG. 5a) such that the lower half 541 and the upper half 542 form the stabilizer ring 54. The fuselage barrel 56, as illustrated in FIG. 5a, may be a cured composite fuselage barrel of the center section of a large new generation aircraft, such as the Boeing 7E7 airplane, having a constant contour over the whole length 562. The large one-piece composite fuselage barrel 56 may have a diameter 561 of about 19 feet and a length 562 of more than 24 feet. In this case, both stabilizer rings 54 shown in FIGS. 5 and 5a may have the same diameter 543. It may further be possible to equip the module 51 with a stabilizer ring 54 having a diameter 543 that is different from the diameter 543 of the stabilizer ring 54 that may be used for module 52. The stabilizer ring 54 may be detachable. Furthermore, the stabilizer ring 54 may be mounted on the rails 55 that allow for about 36 inches of travel from the front 531 towards the back 532 and vice versa. The ring travel may be mechanically assisted but may not need to be precisely controlled or automatically actuated. Module 51 and module 52 may be connected to form the two-ring modular assembly cart 50 by joining the back 532 of the cart base 53 of module 51 with the back 532 of the cart base 53 of the module 52. As shown in FIG. 5, the two stabilizer rings 54 may be located at opposite ends of the modular assembly cart 50 supporting the fuselage barrel 56. As shown in FIG. 5a, the load position may be outboard with a ring separation 57 of approximately 23 feet. The ring separation 57 may be adjusted according to the length 562 of the fuselage barrel 56. The stabilizer ring 54 may further include a plurality of clamps 21 as shown in FIGS. 1 and 7 and as described above.

Figure 6:
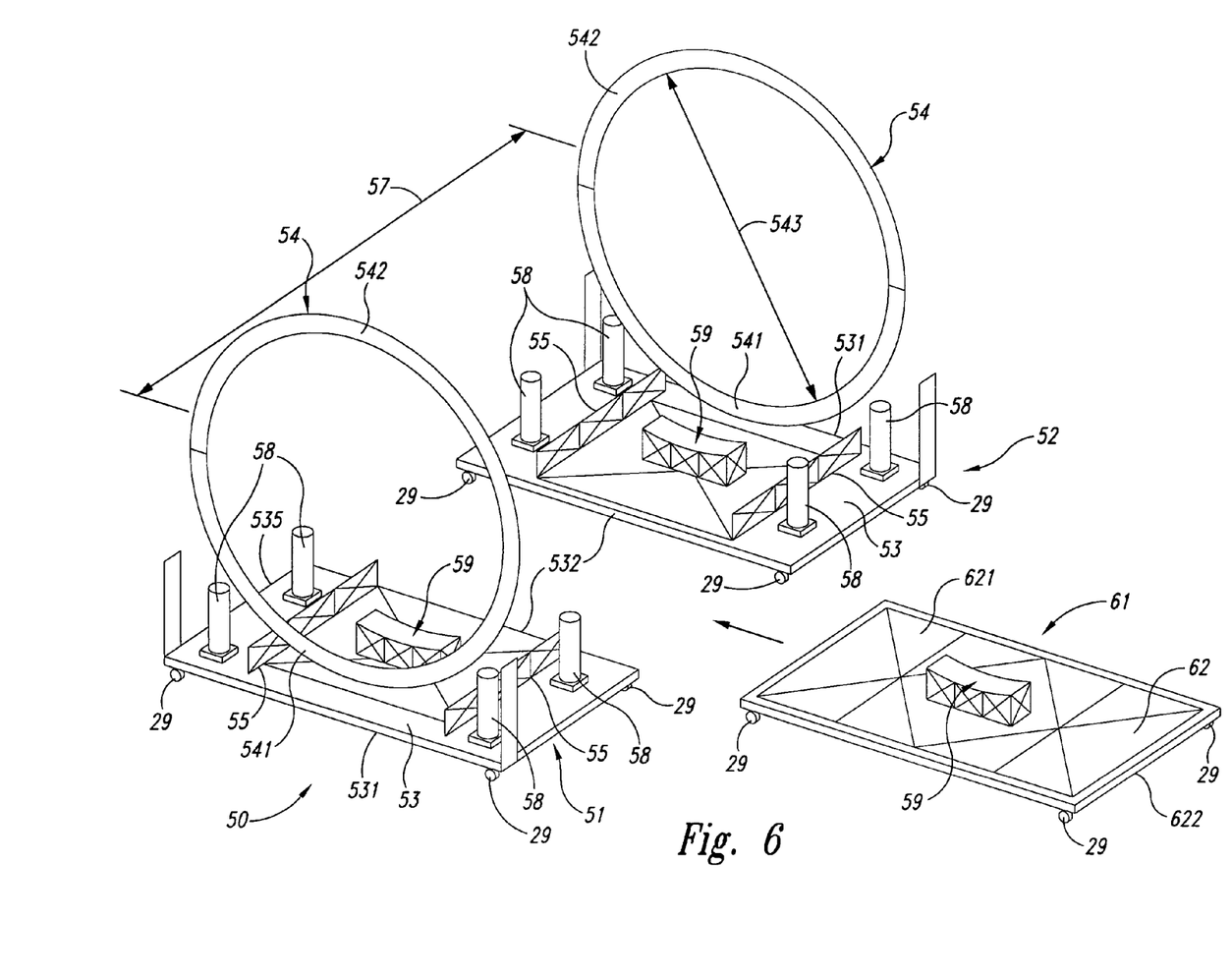
FIG. 6 is a perspective front view of a two-ring modular assembly cart according to another embodiment of the present invention.

Referring now to FIG. 6, a perspective front view of a two-ring modular assembly cart 50 is illustrated according to another embodiment of the present invention. In addition to the module 51 and the module 52 (as illustrated in FIG. 5), the assembly cart 50 may further include a module 61. The module 61 may include a cart base 62 having a top 621 and a bottom 622. The cart base 62 may include a plurality of casters 29 attached to the bottom 622. The casters 29 may swivel and may be used to move the module 61 along the factory floor. A fuselage support 59 (as described above) may be attached to the top 621 of the cart base 62, preferably in the center of the cart base 62. If needed, for example, to support a fuselage barrel 56 that has a greater length 562 than the fuselage barrel 56 shown in FIG. 5a, the modules 51 and 52 may be moved apart from each other and the module 61 may be inserted between the module 51 and the module 52 to form the two-ring modular assembly cart 50. By providing the modules 51, 52, and 61, as shown in FIGS. 5 and 6, the two-ring modular assembly cart 50 may be assembled as needed to support a fuselage barrel of any shape, for example, the fuselage barrel 31 (shown in FIG. 1) of the aft section of a large new generation aircraft, such as the Boeing 7E7 airplane, the fuselage barrel 39 (shown in FIG. 3) of the front section of a large new generation aircraft, such as the Boeing 7E7 airplane, or the fuselage barrel 56 (shown in FIG. 5a) of the center section of a large new generation aircraft, such as the Boeing 7E7 airplane. It may be possible to use one or more additional modules 51, 52, and 61. Furthermore, by providing the module 61, the fuselage barrel 56 may be supported even while detaching one stabilizer ring 54. Detaching the stabilizer rings 54 from the fuselage barrel 56 may become necessary for repositioning, for example, to allow access to areas originally covered by the stabilizer ring 54 for machining, material testing, or assembly operations.

Figure 7:
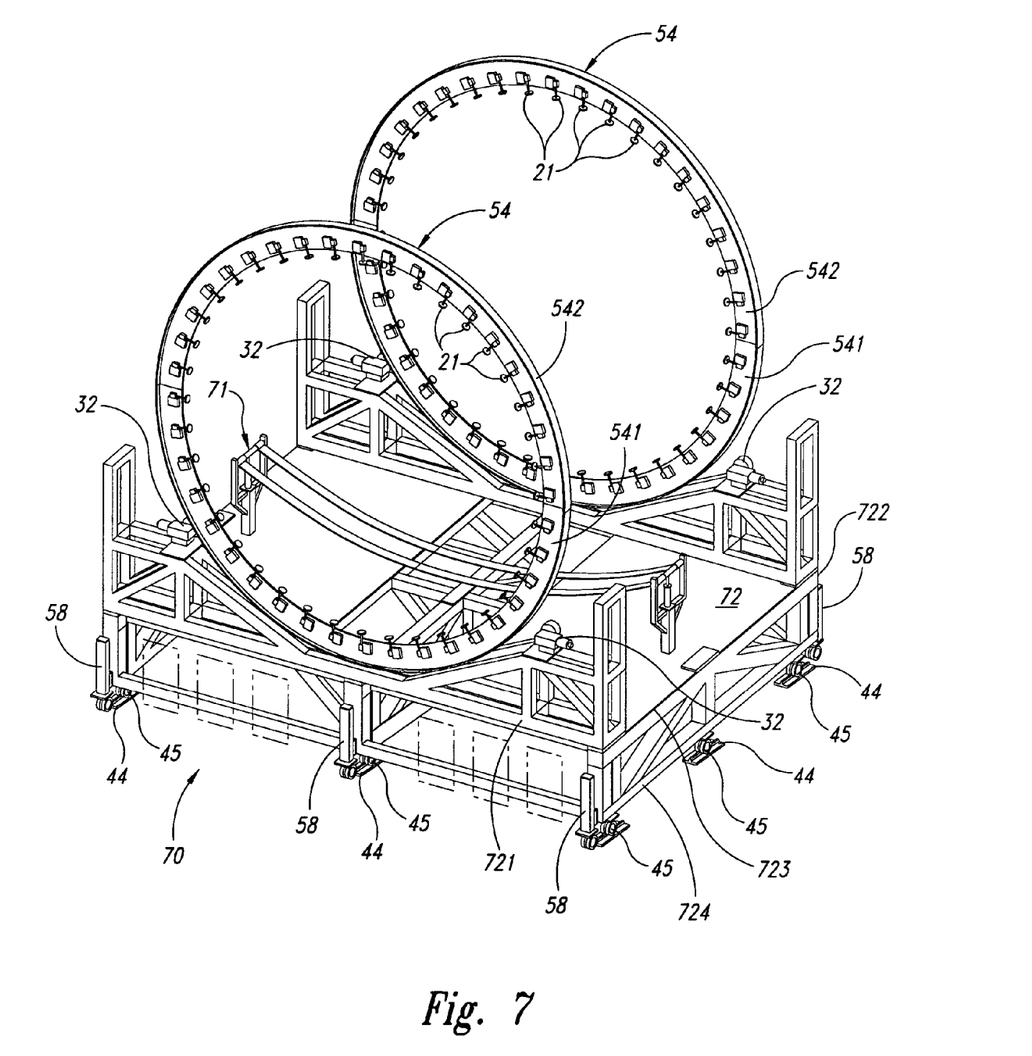
FIG. 7 is a perspective front view of a two-ring assembly cart with strap fuselage support according to another embodiment of the present invention.

Referring now to FIG. 7, a perspective front view of a two-ring assembly cart 70 with strap fuselage support 71 is illustrated according to another embodiment of the present invention. The two-ring assembly cart 70 may include a cart base 72 having a front 721, a back 722, a top 723, and a bottom 724. A first stabilizer ring 54 may be attached proximate to the front 721 and on top 723 of the cart base 72. A second stabilizer ring 54 may be attached proximate to the back 722 and on top of the cart base 72. The stabilizer rings 54 may include a lower half 541, an upper half 542, and a plurality of clamps 21, as described above. The stabilizer rings 54 may also be rotated after insertion of a fuselage barrel 56. A plurality of V-groove wheels 45 may be attached to the bottom 724 of the cart base 72 that allow the assembly cart 70 to be moved along V-tracks 44 (also shown in FIG. 4). A plurality of jacking cylinders with integrated caster wheels 58 may be attached to the front 721 and the back 722 of the cart base allowing up and down movement of the assembly cart 70. Furthermore, a strap fuselage support 71 may be mounted to the top 723 of the cart base preferably in the center between the first stabilizer ring 54 and the second stabilizer ring 54. The strap fuselage support 71 may provide additional support for stabilizing a one-piece fuselage barrel 56. Furthermore, by providing the strap fuselage support 71 it may be possible to detach one of the two stabilizer rings 54 and to reposition the detached stabilizer ring 54. The strap fuselage support 71 may also be designed as a sling that may be supported from above by a crane (not shown).

Figure 8:
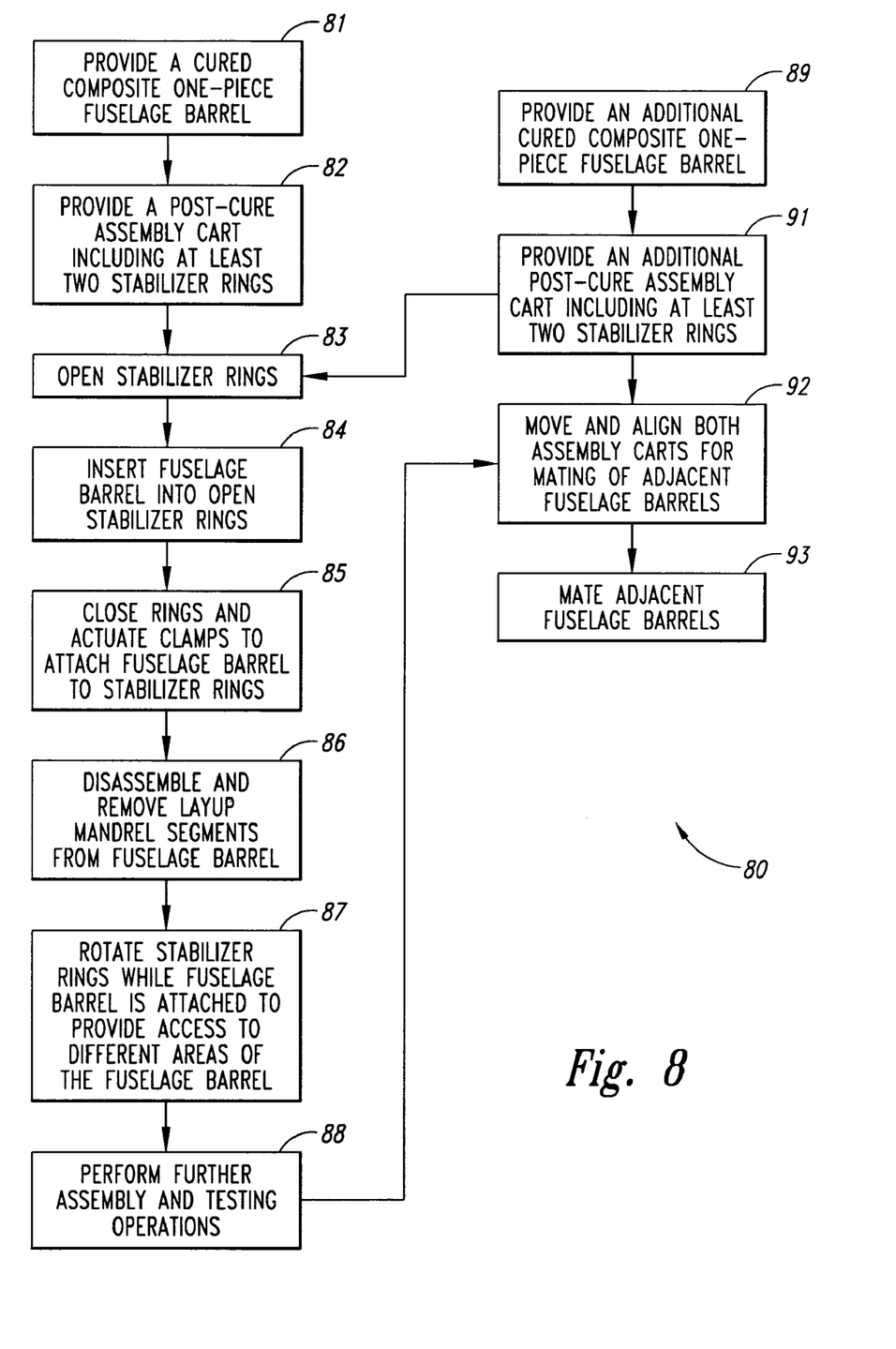
FIG. 8 is a block diagram of a method for stabilizing a cured composite fuselage barrel according to another embodiment of the present invention.

Referring now to FIG. 8, a flow chart of a method 80 for stabilizing a large cured composite fuselage barrel 31 is illustrated according to another embodiment of the present invention. The method 80 may include the following steps: providing a large cured composite one-piece fuselage barrel having a diameter of about 19 feet and a length of more than 24 feet (step 81), such as the fuselage barrel 31 (as shown in FIG. 1), the fuselage barrel 39 (as shown in FIG. 3), or the fuselage barrel 56 (as shown in FIG. 5a) and providing a post-cure assembly cart that includes at least two stabilizer rings (step 82), for example, assembly cart 10 (shown in FIG. 1), assembly cart 30 (shown in FIG. 3), assembly cart 40 (shown in FIG. 4), assembly cart 50 (shown in FIGS. 5 and 6), and assembly cart 70 (shown in FIG. 7). The method 80 may further include the steps of: opening the stabilizer rings (step 83), such as stabilizer rings 17, 18, and 19 (FIG. 1), stabilizer rings 38 (FIG. 3), stabilizer rings 43 (FIG. 4) or stabilizer rings 54 (FIGS. 5,6 and 7); inserting a fuselage barrel into the open stabilizer rings (step 84) and closing the stabilizer rings (step 84); and actuating clamps 21 that may be attached to the inner surface of the stabilizer rings (step 85) and, therefore, attaching the fuselage barrel to the stabilizer rings. It may now be possible to disassemble and remove the layup mandrel segments from the fuselage barrel (step 86). In step 87, the stabilizers rings, such as the stabilizer rings 17, 18, and 19 (FIG. 1) may be rotated while the fuselage barrel 31 is still attached. This allows access to different parts of the fuselage barrel 31 and further assembly or testing operations may be conducted in step 88. If an additional fuselage barrel 31 is provided (step 89) and stabilized with an additional assembly cart 10 (FIG. 1), as in step 91, it may be possible to mate the two move and align both assembly carts 10 (step 92) for mating of two adjacent fuselage barrels 31 (step 93). By providing modular assembly carts, such as assembly cart 40 (FIG. 4) or assembly cart 50 FIGS. 5, 5a, and 6), any shape and size of a composite barrel, for example, fuselage barrels of the aft section, the center section or the forward section of a large new generation aircraft, such as the Boeing 7E7 aircraft, may be stabilized after curing of the composite material.

It should be understood, of course, that the foregoing relates to exemplary embodiments of the invention and that modifications may be made without departing from the spirit and scope of the invention as set forth in the following claims.

We claim:

1. A one-piece barrel assembly cart, comprising:
    a right assembly cart base having an inner surface;
    a left assembly cart base having an inner surface, wherein said left assembly cart base is joined with said right assembly cart base at said inner surfaces;
    at least two stabilizer rings, wherein each stabilizer ring is divided into a right half and a left half, wherein said right half is attached to said right assembly cart base and wherein said left half is attached to said left cart base;
    a plurality of clamps being attached to said stabilizer rings;
    a plurality of casters attached to said bottom and evenly distributed along said outer surface and said inner surface of said right assembly cart base and of said left assembly cart base;

a plurality of support jack assemblies attached to said bottom and evenly distributed along said outer surface and said inner surface of said right assembly cart base and of said left assembly cart base;

a plurality of pitch and yaw jack assemblies attached to said bottom and evenly distributed along said outer surface and said inner surface of said right assembly cart base and of said left assembly cart base; and a plurality of ring support jack assemblies mounted underneath each of said stabilizer rings.

2. A one-piece barrel assembly cart, comprising:

a cart base having wheels;

at least two stabilizer rings mounted to the cart base, wherein each stabilizer ring is divided into sections but can be joined together to form a continuous ring; and a plurality of barrel clamps attached to said stabilizer rings;

wherein said stabilizer rings receive a fuselage barrel made out of a cured composite material having a tapered shape, an outside, and including longitudinal stiffeners, wherein said clamp attaches to said outside of said barrel at a location of said longitudinal stiffener.

3. A one-piece barrel assembly cart, comprising:

a cart base having wheels;

at least two stabilizer rings mounted to the cart base, wherein each stabilizer ring is divided into sections but can be joined together to form a continuous ring; and a plurality of barrel clamps attached to said stabilizer rings;

wherein said cart base, and said stabilizer rings stabilize a composite fuselage barrel having a length of at least 24 feet.

4. A cart for removing a fuselage barrel from an inner mold line (IML) tool, the cart comprising:

a cart base having wheels;

at least two stabilizer rings attached to the cart base for stabilizing the barrel before the barrel is removed from the IML tool, wherein each stabilizer ring is divided into a right half and a left half configured to be joined to form a continuous ring, each said continuous ring half adapted to rotate relative to said cart base; and a plurality of clamps distributed about the rings and operative on an outer surface of the barrel for preventing the barrel from collapsing while the barrel is being wheeled away from the IML tool.

5. The cart of claim 4, further comprising at least six ring guides attached to the cart base, and wherein said stabilizer rings are movable on said ring guides.

6. The cart of claim 4, wherein said cart base includes right and left assembly cart bases that are joined together, and wherein the right assembly cart base has the same dimensions as the left assembly cart base.

7. The cart of claim 4, wherein the rings fit around a fuselage barrel having a diameter of at least 19 feet.

8. The cart of claim 4, wherein said clamps are attached to inner surfaces of the stabilizer rings.

9. The cart of claim 4, wherein said stabilizer rings receive said fuselage barrel, wherein said clamps attach to said fuselage barrel, and wherein said cart further comprises a plurality of ring support jack assemblies mounted underneath each of said stabilizer rings for rotating said stabilizer rings.

10. The cart of claim 4, wherein said clamps are force limiting vacuum toggle clamps.

11. The cart of claim 4, further comprising means for lifting the cart so the fuselage barrel can be mated with another fuselage barrel.

12. A system comprising:

an aircraft fuselage barrel; and the cart of claim 4, wherein the barrel is carried on the cart, stabilized by the rings, and prevented from collapsing under its own weight by the clamps.

13. The system of claim 12, further comprising an additional fuselage barrel and an additional for carrying the additional barrel, the carts positioned so the barrels are mated.

* * * * *

UNITED STATES PATENT AND TRADEMARK OFFICE
CERTIFICATE OF CORRECTION

PATENT NO. : 7,624,488 B2
APPLICATION NO. : 11/005667
DATED : December 1, 2009
INVENTOR(S) : Lum et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 792 days.

Signed and Sealed this

Twenty-sixth Day of October, 2010

David J. Kappos
*Director of the United States Patent and Trademark Office*